United States Patent [19]

Schrüfer et al.

[11] Patent Number: 5,909,878
[45] Date of Patent: Jun. 8, 1999

[54] MECHANICAL FACE SEAL ASSEMBLY

[75] Inventors: Andreas Schrüfer, Wolfratshausen; Walter Ittner; Reinhard Svejkovsky, both of Geretsried; Andreas Schöpf, Baierbrunn; Dieter Ziegenbein, Neusäss, all of Germany

[73] Assignee: Feodor Burgmann Dichtungswerke GmbH & Co., Wolfratshausen, Germany

[21] Appl. No.: 08/797,896

[22] Filed: Feb. 10, 1997

[30] Foreign Application Priority Data

Feb. 15, 1996 [DE] Germany ............... 296 02 685 U

[51] Int. Cl.⁶ .................................................. F16J 15/34
[52] U.S. Cl. ............................................ 277/398; 277/361
[58] Field of Search ................................. 277/398, 361, 277/408, 358, 366

[56] References Cited

U.S. PATENT DOCUMENTS

| | | | |
|---|---|---|---|
| 2,612,390 | 9/1952 | Lewis ................................. | 277/408 |
| 3,746,349 | 7/1973 | Smale et al. ....................... | 277/398 |
| 3,843,140 | 10/1974 | Mayer et al. ..................... | 277/408 |
| 4,923,377 | 5/1990 | Cavalleri ........................ | 277/398 X |
| 5,217,234 | 6/1993 | Hornsby ......................... | 277/366 X |

FOREIGN PATENT DOCUMENTS 834 923   5/1960   United Kingdom .
2 286 020   8/1995   United Kingdom .

*Primary Examiner*—Anthony Knight
*Assistant Examiner*—Greg Binda
*Attorney, Agent, or Firm*—Griffin, Butler, Whisenhunt & Szipl, LLP

[57] ABSTRACT

A mechanical face seal assembly for sealing a rotating member with respect to a stationary member comprises at least a pair of cooperating annular sealing elements, of which one is mountable in a non-rotating manner with respect to the stationary member and the other for common rotation with the rotating member. Between the rotating member and the non-rotating sealing element an annular space is defined, the radial dimension of which varies between a region of minimum radial dimension and a region of maximum radial dimension, which are offset circumferentially to each other. Inlet means for introducing a buffer liquid into the annular space at or near to the region having a maximum radial dimension and outlet means for discharging said buffer liquid from said annular space at or near to the region having a minimum radial dimension are provided. At least one delivery-promoting recess is formed in a portion of the rotating member oriented axially to said annular space for promoting a flow of the buffer liquid along the annular space from the inlet to the outlet means and for receiving gas bubbles released from the buffer liquid when pressurized in the annular space.

8 Claims, 2 Drawing Sheets

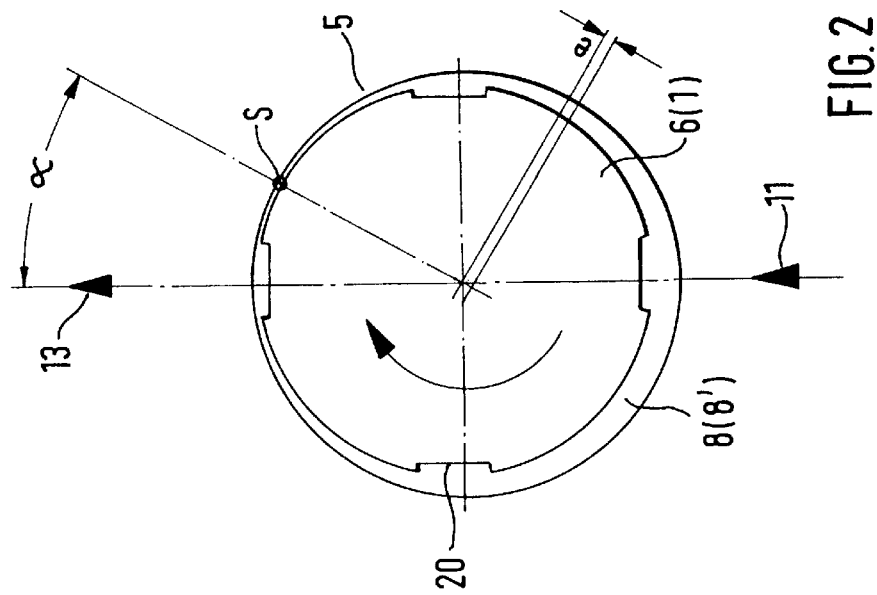
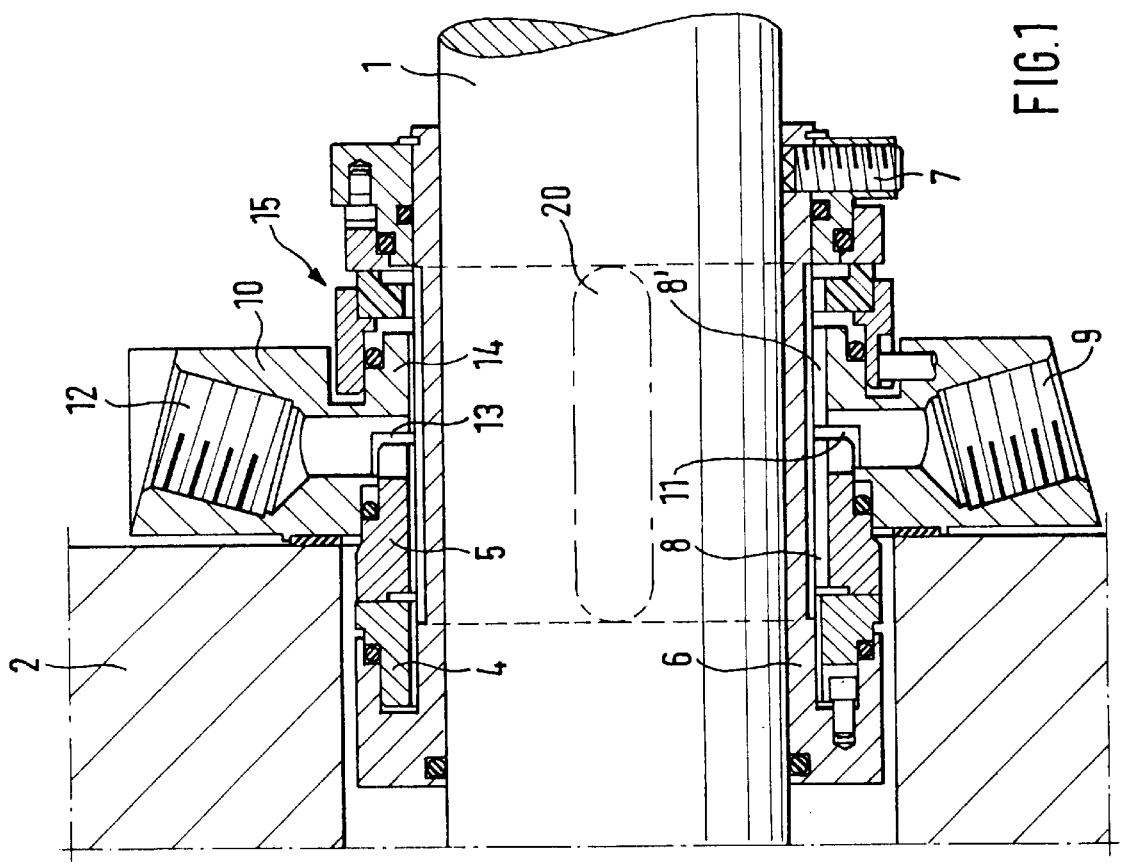

MECHANICAL FACE SEAL ASSEMBLY

The invention relates to a mechanical face seal assembly and, more particularly, to a mechanical face seal assembly with positive cooling and lubrication of the sealing elements by means of a buffer or barrier liquid.

BACKGROUND OF THE INVENTION

In a known face seal assembly according to GB-A 2 286 020 of a type having a pair of annular sealing elements and a eccentric annular space or clearance between a shaft and the non-rotating annular sealing element the eccentric space in which a buffer liquid can be introduced has an axial dimension which differs only insignificantly from the cross-sectional area of inlet and outlet ports through which the buffer liquid is introduced into or discharged from the annular space, respectively. Accordingly the cooling and lubricating effect of the buffer liquid on the annular sealing elements is relatively low. In the U.S. Pat. No. 3,746,349 although the eccentric annular space is elongated, tests carried out within the scope of the present invention have shown that there is still need of a substantial improvement in the cooling and lubricating capacity, since due to prevailing centripetal forces gases contained in and released from the buffer liquid when pressurized in the eccentric annular space may collect in the narrow portions of the annular space, resulting in a corresponding constriction of the cross-sectional flow area so that a flow of the buffer liquid along the annular space will be affected or even totally prevented. From E. Meyer "Axiale Gleitring-dichtungen", published by VDI-Verlag, Düsseldorf/Germany, 1966, it is further known to provide in a stationary member an eccentric pressure chamber for pumping a buffer liquid. The chamber is part of a pumping device which functions as a centrifugal pump in that the eccentric chamber cooperates with a pumping ring concentrically disposed on the rotating sealing element and having a number of vane-type pumping elements. The pumping ring can affect the performance of rotating sealing element and, furthermore, unwanted turbulences of the buffer liquid may occur in portions of the mechanical face seal assembly which necessitate good cooling and lubrication.

SUMMARY OF THE INVENTION

An object of the invention is to provide a mechanical face seal assembly of a type referred to above which has an improved cooling and lubricating effect. It is a further object of the invention to provide a mechanical face seal assembly in which a blockage of the annular space due to gases released from the buffer liquid is avoided.

A mechanical face seal assembly in accordance with the present invention for sealing a rotating member with respect to a stationary member comprises at least a pair of cooperating annular sealing elements, in which one annular sealing element can be mounted in a nonrotatably manner with respect to the stationary member and the other for common rotation with the rotating member. Between the rotating member and the non-rotating sealing element an annular space is defined, the radial dimension of which varies between a region of minimum radial dimension and a region of maximum radial dimension offset circumferentially to each other. Inlet means for introducing a buffer liquid into the annular space at or in the vicinity of the region having a maximum radial dimension and outlet means for discharging the buffer liquid from the annular space at or in the vicinity of the region thereof having minimum radial dimension are provided. At least one delivery-promoting recess for promoting a flow of the buffer liquid along the annular space from the inlet to the outlet means is formed in at least a portion of said rotating member, which is oriented axially to said annular space.

The delivery-promoting recess can easily be formed in the rotating member without weakening the rotating sealing element thereby. The recess has the effect not only that the buffer liquid is positively forced to flow from the inlet to the outlet means of the annular space, in which this being further promoted by the eccentric configuration of the annular space. In addition, the delivery-promoting recess is a portion in the rotating member in which during rotation of rotating member gas released from the buffer liquid may collect and transported to the outlet means and from there discharged outwardly. The accumulation of gas bubbles, namely at the narrow portions of the annular space is thus effectively avoided. In addition, the elongated recess results in a splitting of the liquid flow, in that a circumferential flow is fanned out along the axial length of the annular space which has an advantageous effect on the cooling and lubrication of the annular sealing elements. The delivery-promoting recess may have the shape of a circumferentially closed elongated groove having a closed bottom in the shaft or rotating member to be sealed. The rotating annular sealing element does not need to be modified.

Preferably, the delivery-promoting recess has an axial dimension which is at least equal to the axial dimension of the annular space, it being most preferred that the recess is extended in its axial length beyond the axial extension of the annular space. It has been found that by these measures an effective contribution towards preventing the collection of gas bubbles in the annular space is made. In accordance with another preferred embodiment of the invention the flow cross-sectional area of inlet and outlet ports of the inlet or outlet means should be at least substantial equal to the flow cross-sectional area of inlet or outlet passages, respectively, of the inlet or outlet means communicating with the inlet or outlet ports, respectively (depicted in FIG. 3). As a result the delivery capacity of the eccentric annular space and the delivery-promoting recess can substantially be improved since any flow constriction at the inlet and outlet ports can be a detriment to flow of the buffer liquid along the annular space. Advantageously the mechanical face seal assembly in accordance with the invention may be configured as a slide-in unit ready for installation. It is further preferred that a plurality of delivery-promoting recesses are formed in the rotating member.

BRIEF DESCRIPTION OF THE DRAWINGS

The invention will now be explained in more detail on the basis of a preferred embodiment with reference to the drawings, in which:

FIG. 1 is a longitudinal sectioned, partly fragmented view of a mechanical face seal assembly in accordance with the invention when installed in a bore of a housing for sealing it with respect to a shaft, and FIG. 2 is a schematic view of a detail of the face seal assembly in accordance with the invention.

DETAILED DESCRIPTION

Figure 3:
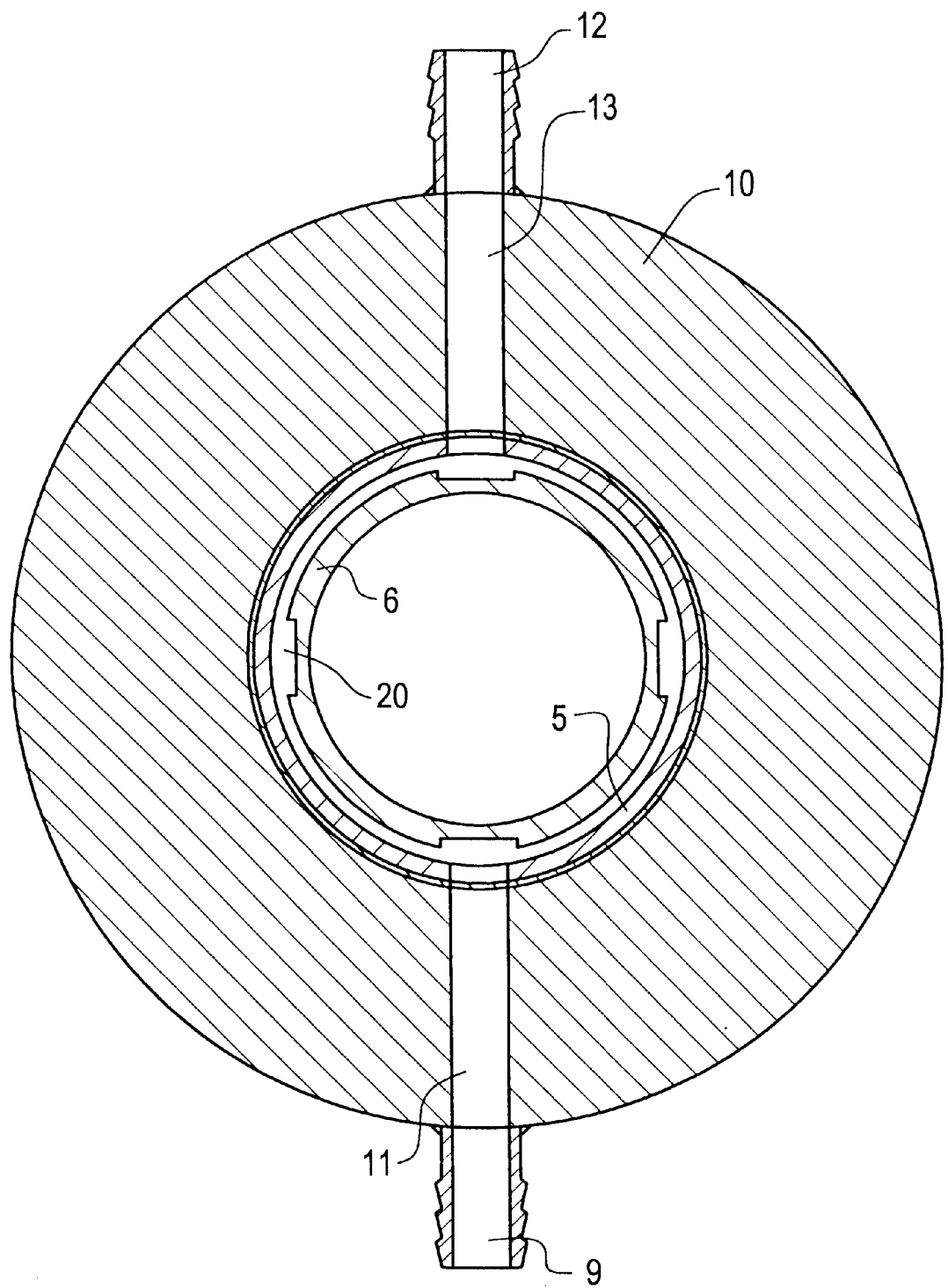
FIG. 3 is a cross-sectional view of a mechanical face seal assembly of this invention in which flow cross sections of inlet and outlet ports are equal to flow cross-sectional areas of inlet and outlet passages.

In FIG. 1 the reference numeral 1 relates to a shaft extending through a bore of a housing 2. The mechanical face seal assembly comprises a pair of cooperating annular sealing elements 4, 5 of which the sealing element 4 is mounted to a bushing 6 fitted on the shaft 1 for common rotation therewith, so that the sealing element 4 rotates common with the shaft 1. The other sealing element 5 is mounted to a stationary member 10 and prevented from relative rotation thereto. The stationary member 10 can be mounted to the housing 2 by suitable means, e.g. bolts.

The annular sealing elements 4, 5 have cooperating radial sealing faces between which, in operation, a sealing gap is formed to seal a space provided at one radial end of the sealing gap with respect to a space provided at the other radial end of the sealing gap. A biasing means (not shown) may be provided to bias the sealing elements 4, 5 against each other so that when the shaft 1 is stationary the sealing faces are maintained in sealing contact with each other. The principle structure of a mechanical face seal assembly of a type as described above is known to a person skilled in the art so that a description of further details can be omitted.

In accordance with the present invention between the inner circumferential surface of the non-rotating sealing element 5 and the outer circumferential surface of the rotating member or bushing 6 an eccentric annular space 8 is provided into which a buffer liquid may be introduced. For this an inlet passage 9 is formed in the stationary member 10 communicating with an inlet port 11 porting into the annular space 8. The inlet port 11 may partly pass through the non-rotating sealing element 5 and partly through a bore in a portion 14 of the stationary member 10 surrounding the bushing 6.

At a position diametrally opposing the inlet passage 9 an outlet passage 12 is provided communicating with an outlet port 13 which ports into the annular space 8 so that a buffer liquid introduced via the inlet passage 9 and the inlet port 11 into the annular space 8, after a flow along the annular space 8, can be discharged at a position diametrally opposed to the inlet position via the outlet port 13 and the outlet passage 12 to the outside for further treatment, e.g. for heat exchange with a cooling fluid in a cooling assembly (not shown).

The annular space 8 has a radial width which is continuously reduced from a position at the inlet port 11 to a position at the outlet port 13 in that the center point of a bore in the non-rotating annular sealing element 5 is disposed eccentric with respect to the center point of the bushing 6 by a suitable value "e", as can be seen from FIG. 2, resulting in that the annular space 8 has an eccentric cross-sectional configuration when viewed in a radial plane.

The inlet and outlet ports 11, 13 are disposed at or near to the portions of the annular space 8 having the maximum or minimum radial dimensions, respectively, so that a buffer liquid flowing from the inlet port 11 to the outlet port 13 is pressurized due to the continuously constricting cross-sectional area of the annular space 8. This causes a positive flow of the buffer liquid along the annular space 8 when a portion of the periphery of the bushing 6, as indicated by the arrow in FIG. 2, rotates from a position near the inlet port 11 to a position near the outlet port 13.

Instead of a diametrally opposing arrangement of the inlet and outlet ports 11, 13, other suitable angular relationships between these ports may be provided. As shown in FIG. 2 the outlet port 13 may be offset with respect to a location S of the annular space 8 at which it has a minimum radial dimension, by an angle α in a direction opposite the direction the bushing 6 rotates. The angle α may be between approx. 15° and 90°.

In accordance with the invention it has been found that the flow of the buffer liquid promoted by the eccentric configuration of the annular space 8 alone is not sufficient for an adequate cooling and lubricating effect of the buffer liquid on the annular sealing elements and other parts of the mechanical face seal assembly which require proper cooling. In addition, it has been found that gas, present in the buffer liquid in dissolved form and released therefrom, can easily accumalate to gas bubbles which can constrict the flow cross-sectional area of the annular space 8 in a manner that a flow of the buffer liquid along the annular space 8 is substantially reduced or even totally prevented.

In accordance with the invention these undesired effects of the gas bubbles can be avoided, by forming in the outer circumferential surface of the bushing 6 a plurality of elongated delivery-promoting, groove-shaped recesses 20 which may be equally angularly spaced from each other with their longer axes parallel to the longitudinal axis of the bushing 6. More particularly, each groove-shaped recess 20 has an axial dimension which is at least equal to the axial dimension of the annular space 8 or of the non-rotating sealing element 5. It is preferred that each recess 20 is extended in length on both sides beyond the axial dimensions of the annular space 8 or the non-rotating sealing element 5, but yet remaining within the axial limits of the bushing 6. Accordingly each recess 20 has a trough-like configuration with a side wall continuously extending all around the recess and a closed bottom.

It is to be noted that in the preferred embodiment of the invention as shown the annular space 8 includes a portion 8' defined between the inner circumferential surface of the bore in the portion 14 of the stationary member 10 and the outer circumferential surface of the bushing 6. In this case the groove-shaped recesses 20 should have an axial dimension which is at least the same as the total axial dimension of the annular space 8, i.e. including its portion 8', preferably somewhat larger.

It will be appreciated that the number and configuration of the recesses 20 is not restricted to that shown in FIGS. 1 and 2 which comprises four recesses. Instead, more or less recesses 20 can be provided. Instead of only a single recess 20 along a particular axial portion of the bushing 6 a plurality of e.g. circular recesses may be arranged axially in sequence which should be connected to each other. Furthermore, the cross-section of each recess in a radial plane may differ from a rectangular cross-section as shown in FIG. 2, e.g. the recesses may have a triangular or any other suitable cross-section.

The recesses 20 have the effect that the buffer liquid introduced via the inlet port 11 into the annular space 8 is transported in the direction of the outlet port 13 not only by mere entrainment but also in a positive manner by the recesses 20 which function as circumferentially closed troughs so that a boosted flow takes place. Furthermore, gas bubbles released from the buffer liquid will collect with preference in the recesses 20 due to prevailing centripetal forces. The gas bubbles having accumulated in the recesses 20 are compressed during rotation of the bushing 6 from the inlet port 11 to the outlet port 13 due to the eccentric configuration of the annular space 8 and are then discharged to the outside together with the buffer liquid via the outlet port 13 and the outlet passage 12.

Reference numeral 15 in FIG. 1 relates to an additional pair of annular sealing elements for sealing with respect to the environment the annular space 8 at its axial end remote from the pair of annular sealing elements 4, 5.

As shown in FIG. 1, the mechanical face seal assembly may be configured as a slide-in unit or cartridge ready for installation, comprising all of the aformentioned components, for arrangement in the bore of the housing 2.

Although the invention has been described above with respect to an embodiment having delivery-promoting recesses which are provided in a bushing mounted on the shaft, it is understood that the rotating member containing the recesses may be the shaft itself.

It will be appreciated that various modifications of the specific embodiments of the invention described above are envisaged within the scope of the invention as set forth in the appended claims.

What is claimed is:

1. A mechanical face seal assembly for sealing a rotating member with respect to a stationary member, comprising at least a pair of cooperating annular sealing elements, in which one of said annular sealing elements is mountable in a non-rotating manner with respect to said stationary member and the other for common rotation with said rotating member, between said rotating member and said non-rotating annular sealing element an annular space being defined, the radial dimension of which varies between a region of minimum radial dimension and a region of maximum radial dimension, said regions being offset circumferentially to each other, inlet means for introducing a buffer liquid into said annular space at or adjacent said region having a maximum radial dimension, and outlet means for discharging said buffer liquid from said annular space at or adjacent the region thereof having a minimum radial dimension, wherein at least one delivery-promoting recess for promoting a flow of the buffer liquid along the annular space from the inlet to the outlet means is formed in a portion of said rotating member, which is oriented axially to said annular space, wherein said annular space is axially extended beyond the axial dimension of said non-rotating annular sealing element.

2. The mechanical face seal assembly as set forth in claim 1, wherein said recess has a continuous closed side wall and a closed bottom, the axial dimension of said recess being at least equal to that of said annular space.

3. The mechanical face seal assembly as set forth in claim 2, wherein said continuous closed side wall extends approximately perpendicular to on outer surface of said rotating member.

4. The mechanical face seal assembly as set forth in claim 1, wherein said inlet means defines an inlet port for said buffer liquid porting into said annular space, and an inlet passage communicated with said inlet port, the flow cross-section of said inlet port being at least substantially equal to the flow cross-section of said inlet passage, and wherein said outlet means defines an outlet port for said buffer liquid porting into said annular space, and an outlet passage communicated with said outlet port, the flow cross-section of said outlet port being at least substantially equal to the flow cross-section of said outlet passage.

5. The mechanical face seal assembly as set forth in claim 1, wherein a portion of said annular space is radially defined by a hole in a portion of said stationary member.

6. The mechanical face seal assembly as set forth in claim 1, wherein said mechanical face seal assembly is formed as a slide-in unit.

7. The mechanical face seal assembly as set forth in claim 1, wherein said recess has a continuous closed side wall and a closed bottom, and wherein the continuous closed side wall extends approximately perpendicular to an outer surface of said rotating member.

8. The mechanical face seal assembly as set forth in claim 1, wherein said recess has an axial extension substantially equal to an axial extension of said annular space.

\* \* \* \* \*